United States Patent [19]
Peerman

[11] 3,859,234
[45] Jan. 7, 1975

[54] FABRIC BONDING IMPROVEMENT

[75] Inventor: Dwight E. Peerman, Minneapolis, Minn.

[73] Assignee: General Mills Chemicals, Inc., Minneapolis, Minn.

[22] Filed: Sept. 25, 1970

[21] Appl. No.: 75,746

[52] U.S. Cl.............. 260/18 N, 161/190, 161/227, 260/404.5
[51] Int. Cl............................................ C08g 51/60
[58] Field of Search ....... 260/18 N, 404.5; 161/190, 161/227

[56] References Cited
UNITED STATES PATENTS

| | | | |
|---|---|---|---|
| 3,444,026 | 5/1969 | Peerman | 260/18 |
| 3,447,999 | 6/1969 | Rogier et al. | 260/18 |
| 3,454,412 | 7/1969 | Stokes | 260/18 |
| 3,483,237 | 12/1969 | Peerman et al. | 260/404.5 |
| 3,531,423 | 9/1970 | Stokes et al. | 260/18 |
| 3,565,837 | 2/1971 | Drawert et al. | 260/18 |

FOREIGN PATENTS OR APPLICATIONS

| | | | |
|---|---|---|---|
| 1,129,595 | 10/1968 | Great Britain | 260/18 |
| 6,601,952 | 8/1966 | Netherlands | 260/18 |

*Primary Examiner*—Melvyn I. Marquis
*Assistant Examiner*—E. C. Rzucidlo
*Attorney, Agent, or Firm*—Anthony A. Juettner; Gene O. Enockson

[57] ABSTRACT

Fabrics are bonded with an improved polyamide adhesive prepared from (1) a mixture of polymeric fat acids having a dimeric fat acid content of at least 86% and a copolymerizing aliphatic dicarboxylic acid of 6–12 carbon atoms and (2) a mixture of hexamethylene diamine with xylylene diamine or isophorone diamine. The described polyamides provide improved color and flexibility properties and the manufacture thereof is more controllable.

13 Claims, No Drawings

3,859,234

FABRIC BONDING IMPROVEMENT

This invention relates to improvements in the bonding of fabrics with polyamide adhesives. More particularly, it relates to such improvements wherein the polyamide is prepared using certain combinations of diacids and diamines.

Many attempts to use various polymers (i.e. polyesters, modified acrylics, etc.) in fabric bonding, particularly clothing, have been found to be deficient in one or more of the following:

1. Insufficient bonding to the fabric
2. Difficult to use
3. Little resistance to dry cleaning or the hot detergents, bleaches or high temperatures encountered in commercial or home laundries
4. Too rigid to be comfortable when worn next to the skin
5. Too dark in color or pick up of objectionable color during laundering More recently, I discovered that a number of the above problems could be overcome if the adhesive used was a polyamide prepared from (a) a mixture of a polymeric fat acid of certain characteristics with a second dicarboxylic acid of 6–12 carbon atoms and (b) an alkylene diamine of 2–6 carbon atoms wherein at least 40 equivalent percent of the total amine groups were provided by an alkylene diamine containing 6 carbon atoms. While these adhesives provided many improvements in the bonding of fabrics, they did not completely overcome the discoloration and rigidity problems as associated with some of the polymers earlier used for fabric bonding. Additionally, their manufacture is somewhat difficult to control, presumably because of the chain-stopping effect of ethylene diamine in the most preferred of such polyamide adhesives.

I have now discovered that further improvements can be obtained in the bonding of fabrics with polyamides by preparing and using certain improved polyamides. The improved polyamides are prepared from:

1. a mixture of
   a. a polymeric fat acid having a dimeric fat acid content greater than 86% by weight; and
   b. a copolymerizing aliphatic dicarboxylic acid having from 6–12 carbon atoms; and
2. a mixture of
   c. hexamethylene diamine; and
   d. either xylylene diamine or isophorone diamine or mixtures thereof.

These polyamides provide the following fabric bonding improvements:

1. Better color retention after repeated launderings;
2. Less increase of rigidity or flexural modulus as a function of time; and
3. Increased ease of manufacture.

The present invention thus finds particular utility in the fabrication of articles having at least one fabric portion bonded with a thermoplastic adhesive such as garments or clothing, and more particularly to cleanable articles which are to be subjected to repeated cleaning by way of dry cleaning or laundering. In such clothing or garments, the invention finds utility in the bonding of the seams of the garment with the improved thermoplastic polyamide adhesive thus avoiding the use of sewn seams. The invention is also useful in the attachment of labels, laces and trims to articles or the attachment of accessories such as zippers to garments. While garments or clothing have been specifically mentioned above, the invention also finds utility in other areas where the bonding of fabrics is desirable and/or the articles fabricated are exposed to severe conditions of exposure to moisture and/or heat or repeated wear and abrasion such as tents. Further, articles to which the present invention apply would include draperies, suits, trousers, shirts, skirts, stockings, undergarments and lingerie, seat belts and any article of a fabric nature.

By the term "fabric" herein, it is understood that the term is not limited ot the articles made from only natural fibers such as cotton or wool but would include synthetic fibers such as nylon, polyester, polyolefins and the like, either alone or in mixture with each other or with natural fibers. Thus the term is used herein broadly to indicate items having the nature of cloth and items which are normally used where cloth is used, such as clothing, garments, and other wearing apparel, and would include woven and so-called non-woven fabrics.

Accordingly, the present invention is directed to the bonding of fabrics or articles having at least one fabric portion using the improved polyamide adhesive as identified generally above. It also is directed to the resulting bonded fabrics or articles and to the improved adhesive.

Polymeric fat acids are well known and commercially available. One method of preparation of polymeric fat acids can be seen in U.S. Pat. No. 3,157,681.

Typical compositions of commercially available undistilled polymeric fat acids, based on unsaturated $C_{18}$ fat acids (the mixture of acids derived from tall oil) are:

| | |
|---|---|
| $C_{18}$ monobasic or monomeric fat acids ("monomer") | 5–15% by wt. |
| $C_{36}$ dibasic or dimeric fat acids ("dimer") | 60–80% by wt. |
| $C_{54}$ (and higher) polybasic or trimeric fat acids ("trimer") | 10–35% by wt. |

While the foregoing available product is prepared by the polymerization of the mixture of ethylenically unsaturated fatty acids obtained from tall oil, similar polymeric fat acids may be prepared from other ethylenically unsaturated monocarboxylic acids.

The relative ratios of monomer, dimer and trimer in such unfractionated polymeric fat acids are dependent on the nature of the starting material and the conditions of polymerization. For the purposes of this invention, the term "monomeric fat acids" refers to the unpolymerized monomeric acids, the term "dimeric fat acids" refers to the dimer of the fat acids and the term "trimeric fat acids" refers to the residual higher polymeric forms consisting primarily of trimer acids but containing some higher polymeric forms. The term "polymeric fat acids" as used herein is intended to be generic to polymerized acids obtained from the ethylenically unsaturated fat acids and consists of a mixture of monomeric, dimeric and trimeric fat acids.

The polymeric fat acids employed in the present invention are prepared by polymerizing ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-octadecenoic, 6-octadecenoic (petroselinic), 7-octadecenoic, 8- octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12,14-octadecatrienoic (pseudo eleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosapentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the monoolefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the polymerization of the unsaturated acids. Lower temperatures are generally used when a catalyst is employed.

Reference has been made hereinabove to the monomeric, dimeric and trimeric fat acids present in the polymeric fat acids. The amounts of monomeric fat acids, often referred to as monomer, dimeric fat acids, often referred to as dimer, and trimeric or higher polymeric fat acids, often referred to as trimer, present in polymeric fat acids may be determined analytically by conventional gas-liquid chromatography of the corresponding methyl esters. Another method of determination is a micromolecular distillation analytical method. This method is that of R. F. Paschke et al., J. Am. Oil Chem. Soc., XXXI (No. 1), 5, (1954), wherein the distillation is carried out under high vacuum (below 5 microns) and the monomeric fraction is calculated from the weight of product distilling at 155°C., the dimeric fraction calculated from that distilling between 155°C. and 250°C., and the trimeric (or higher) fraction is calculated based on the residue. Unless otherwise indicated herein, the chromatography analytical method was employed in the analysis of the polymeric fat acids employed in this invention and all limitations on dimeric fat acid content herein are based on this method. When the gas-liquid chromatography technique is employed, a portion intermediate between monomeric fat acids and dimeric fat acids is seen, and is termed herein merely as "intermediate", since the exact nature thereof is not fully known. For this reason, the dimeric fat acid value determined by this method is slightly lower than the value determined by the micromolecular distillation method. Generally, the monomeric fat acid content determined by the micromolecular distillation method will be somewhat higher than that of the chromatography method. Because of the difference of the two methods, there will be some variation in the values of the contents of various fat acid fractions. Unfortunately, there is no known simple direct mathematical relationship correlating the value of one technique with the other.

In order that the improved polyamides used as the adhesives in the present invention provide the desired properties or characteristics, the polymeric fat acid employed must have a dimeric fat acid content, determined by gas-liquid chromotography in excess or greater than 86% by weight (preferably greater than 92%). Where the initially polymerized fat acids have dimer contents below the above percent, they are distilled to yield fractions having the requisite dimer content.

It is preferred that the polymeric fat acids are hydrogenated in order to improve the color thereof. The hydrogenation is accomplished using hydrogen under pressure in the presence of a hydrogenation catalyst. The catalysts generally employed in such hydrogenations are Ni, Co, Pt, Pd, Rh and others of the platinum family. In general, the catalyst is suspended on an inert carrier such as kieselguhr, commonly used with Ni, and carbon, commonly used with platinum family of catalysts.

In the Examples to follow, the polymeric fat acids were those obtained by polymerizing, distilling and hydrogenating the mixture of fat acids derived from tall oil (composed of approximately 40–45% linoleic and 50–55% oleic, such %'s being by weight).

The copolymerizing acid reactant (1)(b) is a dicarboxylic acid of the formula HOOC—R—COOH where R is an aliphatic hydrocarbon chain, preferably straight chain, of 6–12 carbon atoms. Illustrative copolymerizing acids are adipic, sebacic, azelaic, and dodecandioic. Thus the acid component for the polyamide comprises a mixture of the polymeric fat acid set forth above and a copolymerizing dicarboxylic acid. In this mixture, the copolymerizing dicarboxylic acid must contribute at least 30 equivalent percent of the total carboxyl groups present up to about 60 equivalent percent of the carboxyl groups, the remainder of the carboxyl groups, 40–70 equivalent percent, being contributed by the polymeric fat acid. Expressed similarly, the ratio of equivalent percentages of polymeric fat acid to copolymerizing dicarboxylic acid can be in the range of 40:60 to 70:30.

The diamine component comprises (2)(c) hexamethylene diamine and (2)(d) a second diamine which is xylylene diamine and/or isophorone diamine. The ratio of equivalent percentages of (2)(c) to (2)(d) can be in the range of 70:30 to 30:70. More preferably, the ratio is in the range of 60:40 to 40:60.

The improved polyamides may accordingly be described as the thermal amidification products of an acid component comprising:
1. a mixture of
   a. about 40 to 70 carboxyl equivalent percent of a polymeric fat acid having a dimeric fat acid content greater than 86% by weight; and
   b. about 60 to 30 carboxyl equivalent percent of a copolymerizing dicarboxylic acid of the formula HOOC—R—COOH where R is an aliphatic hydrocarbon group having 6–12 carbon atoms; with essentially an amine equivalent amount of
2. a mixture of
   c. about 30 to 70 amine equivalent percent of hexamethylene diamine; and d. about 70 to 30 amine equivalent percent of a second diamine selected from xylylene diamine or isophorone diamine.

The said polyamides have a ball and ring softening point greater than 135°C. and preferably greater than 150°C. They also have an inherent viscosity of at least 0.5.

The improved polyamides are prepared by conventional amidification procedures, which usually include heating at temperatures between 100° and 300°C., preferably 200° to 275°C., for a time sufficient to complete the reaction, usually about 2 to 8 hours and most usually about 4 to 6 hours. The reaction is generally conducted while removing the by-product water of reaction.

A typical heating schedule, which was used in the examples herein is as follows:

The reactants are added to a reaction vessel and heated under nitrogen with stirring over a 2 hour period to about 200°C. and maintained thereat for one hour. The temperature is then raised to 250°C. and maintained at such temperature for 2 hours after which vacuum is applied (0.1 mm. Hg) for an additional 2 hours at 250°C. The product is then discharged, cooled and recovered.

The following Examples I–V illustrate the present invention whereas Examples VI–X show prior polyamide adhesives.

PREPARATION OF POLYAMIDE ADHESIVES

Using the typical procedure set forth above, a series of polyamides were prepared in which the reactants and amounts were as follows:

| Example | Reactant | Equivalent Percent Employed |
|---|---|---|
| I | Polymeric fat acids$^{(A)}$ | 50 |
| | Azelaic acid | 50 |
| | Hexamethylene diamine | 60 |
| | Xylylene diamine | 40 |
| II | Polymeric fat acids$^{(B)}$ | 66 |
| | Azelaic acid | 34 |
| | Hexamethylene diamine | 60 |
| | Xylylene diamine | 40 |
| III | Polymeric fat acids$^{(B)}$ | 60 |
| | Azelaic acid | 40 |
| IV | Hexamethylene diamine | 60 |
| | Xylylene diamine | 40 |
| | Polymeric fat acids$^{(B)}$ | 50 |
| | Azelaic acid | 50 |
| | Hexamethylene diamine | 60 |
| | Xylylene diamine | 40 |
| V | Polymeric fat acids$^{(C)}$ | 66 |
| | Azelaic acid | 34 |
| | Hexamethylene diamine | 70 |
| | Isophorone diamine | 30 |
| VI | Polymeric fat acids$^{(C)}$ | 50 |
| | Azelaic acid | 50 |
| | Hexamethylene diamine | 60 |
| | Ethylene diamine | 40 |
| VII | Polymeric fat acids$^{(D)}$ | 50 |
| | Azelaic acid | 50 |
| | Hexamethylene diamine | 60 |
| | Ethylene diamine | 40 |
| VIII | Polymeric fat acids$^{(E)}$ | 50 |
| | Azelaic acid | 50 |
| | Hexamethylene diamine | 60 |
| | Ethylene diamine | 40 |
| IX | Polymeric fat acids$^{(B)}$ | 66 |
| | Azelaic acid | 34 |
| | Hexamethylene diamine | 60 |
| | Ethylene diamine | 40 |
| X | Polymeric fat acids$^{(F)}$ | 66 |
| | Azelaic acid | 34 |
| | Hexamethylene diamine | 60 |
| | Ethylene diamine | 40 |

The polymeric fat acids (A) through (F) above had the following analyses:

| Polymeric Fat Acid* | % M | % I | % D | % T | T/M |
|---|---|---|---|---|---|
| A | 1.3 | 4.2 | 92.8 | 1.7 | 1.31 |
| B | 1.0 | 4.7 | 92.7 | 1.6 | 1.60 |
| C | 1.3 | 4.0 | 88.3 | 6.4 | 4.90 |
| D | 1.9 | 4.9 | 91.0 | 2.1 | 1.10 |
| E | 1.3 | 4.2 | 94.8 | 6.5 | 5.06 |
| F | 1.0 | 4.5 | 89.4 | 5.0 | 5.0 |

*M = monomer
I = intermediate
D = dimer
T = trimer

The properties of the polyamides were as follows:

| Polyamide of Example | Acid No. | Amine No. | Ball & Ring Melting Point °C. | Inher.$^{(1)}$ ent Viscosity | Tensile$^{(2)}$ Strength (psi) | % Elon-$^{(3)}$ gation | Tensile Modulus$^{(4)}$ (psi) 1 day | 1 week | 1 month |
|---|---|---|---|---|---|---|---|---|---|
| I | 1.1 | 3.0 | 155 | 0.6 | 5450 | 490 | 600 | 490 | 9330 |
| II | 1.5 | 1.9 | 155 | 0.55 | 3550 | 600 | 277 | 344 | 3058 |
| III | 1.2 | 3.5 | 155 | 0.55 | 4960 | 636 | 307 | 1770 | 8035 |
| IV | 0.9 | 3.0 | 163 | 0.55 | 6210 | 510 | 480 | 330 | 1010 |
| V$^{(5)}$ | 3.3 | 2.2 | 188 | 0.72 | 5220 | 370 | 9010 | 920 | 1180 |
| VI | 0.9 | 6.9 | 164 | 0.61 | 4016 | 653 | 1141 | 11,676 | — |
| VII | 2.8 | 3.3 | 156 | — | 4420 | 605 | 2296 | 7988 | 12,827 |
| VIII | 2.7 | 1.8 | 165 | 0.58 | — | — | — | — | — |
| IX | 1.0 | 5.0 | 137 | 0.49 | 2656 | 578 | 5154 | 38,400 | — |
| X | 2.9 | 3.4 | 137 | 0.55 | 2400 | 590 | 3770 | 9370 | — |

$^{(1)}$0.5% concentration in orthochlorophenol run at 30°C.
$^{(2)}$ASTM D-1708.
$^{(3)}$ASTM D-1708.
$^{(4)}$ASTM D 638 modified for use on micro specimens to give relative tensile modulus values for prediction of flexibility or stiffness of the polymers tested. Tensile modulus values below 10,000 psi indicate that the polymers have good flexibility.
$^{(5)}$Polyamides prepared as in Example V but using amine equivalent percents below 30 (i.e. 12% and 16%) of isophorone diamine had very high tensile moduli after one month (i.e. 28,310 and 30,720, respectively).

The above data show that the polyamides of Examples I–IV of the present invention all had very low tensile moduli after one day. Even after one month storage, they all had moduli which were below 10,000 psi. The polyamide of Example V of the invention had a tensile modulus which was initially fairly high but dropped off after one week and was still very low after one month. In contrast, the tensile moduli of the polyamides of comparative Examples VI, VII, IX and X in which measurements were made at either one week or one month's time were high. Thus the polyamides of Examples VI and X were already higher in tensile modulus after one week than any of the polyamides of Examples I–V were in one month. The polyamide of Example VII was higher in modulus after one month than any of the polyamides of Examples I–V. The polyamide of Example IX was far higher in tensile modulus after one week than any of the polyamides of Examples I–V after one month. Had the moduli of the polyamides of Examples VI and IX been measured at one month, they would have been much higher than the measurements made at one week. The low tensile moduli (below 10,000 psi both initially and after one month) of the polyamides of the invention correlates with their property of showing less rigidity or stiffness in fabrics bonded therewith as compared to fabrics bonded with polyamides of the type of Examples VI–X. A low flexural or tensile modulus is closely related with a high degree of flexibility. The ability to retain this flexibility after aging is an important characteristic of resins used in fabric bonding. It means that the more flexible resin will have the better hand when used to bond various fabrics—less stiffness in the bonded area.

In preparing the previous polyamides—i.e. those containing ethylene diamine—the amount of trimer in the polymeric fat acid component needed to be 4–5% in order to prepare high viscosity products. A trimer to monomer ratio of greater than 2 (i.e. 4–7) was necessary to achieve sufficiently high viscosities to pass defined laundering tests. In preparing the polyamides used in this invention employing xylylene and isophorone diamines, it has been found unnecessary to control the trimer content of the polymeric fat acids to such a high level in order to achieve high viscosity. I believe this is due to the functional purity of the reactants and to the fact that unlike ethylene diamine, no cyclizing end-group reaction occurs which prematurely stabilizes the polyamide at a low molecular wight. The use of ethylene diamine in the previous polyamide adhesives results in the production of cyclic end groups which prevent molecular weight build-up. Thus, polyamide adhesives of such type require added trimer to help overcome this limitation of molecular weight.

To support my above theory, an examination of the data of Example II of the present invention shows that the polyamide thereof had an inherent viscosity of 0.55 and was prepared from a polymeric fat acid having a trimer to monomer ratio of 1.6. In contrast, the polyamide of comparative Example IX had only an inherent viscosity of 0.49 when prepared from the same polymeric fat acid. In order to raise the inherent viscosity of the latter type polyamide, a polymeric fat acid having a higher trimer to monomer ratio was required. Thus see comparative Example X wherein the use of a trimer to monomer ratio of 5.0 yielded an ethylene diamine containing polyamide having an inherent viscosity of 0.55. But such polyamide has a high tensile modulus as previously discussed.

It is very desirable to eliminate trimer as the tool to achieve polyamides of high viscosity. At trimer contents of 5–6% there is a distinct danger of the reaction gelling in the reactor. The gelling of a product in the reactor is a time consuming and expensive business to be avoided if at all possible. Thus, the improved polyamides of this invention can be and are preferably prepared using polymeric fat acids having trimer contents below 5% and trimer:monomer ratios below 2. They can of course, but less desirably, be prepared from polymeric fat acids having higher trimer %'s (i.e. up to about 8%) and higher trimer:monomer ratios (i.e. up to about 6).

The following examples serve to further illustrate the invention in the bonding of fabrics with the improved polyamides in comparison to polyamides heretofore used.

EXAMPLE XI

The polyamides of Examples II and IV of the invention and of comparative Example VIII were used to bond fabrics and then subjected to cleaning tests, i.e. laundering and steam pressing by a commercial laundry. The tests were conducted by bonding with the adhesive a 2-inch by 3-inch pima cotton swatch to a polyester (Dacron)-cotton blend shirt purchased in normal commercial channels. The swatch was bonded to the shirt using a one-half-inch bond of adhesive on each end of the swatch, the adhesive being employed in an extruded film having a thickness of 4–5 mils. The bonding was typically carried out in a press employing a bonding temperature of 275°F. for 10 seconds under 150 psi pressure.

The shirts with bonded swatches were then laundered by a commercial laundry using a standard white shirt working procedure prescribed by the American Institute of Launderers, after which the shirts were finish dried in a forced hot air dryer and subsequently steam pressed in a normal steam pressing manner in which the steam temperatures reach a maximum of 340°F. This procedure comprised one cycle. The cycle was then repeated several times.

The standard shirt working procedure mentioned above is as follows:

| | Standard White Shirt Washing Procedure | | | |
|---|---|---|---|---|
| Operation | Time Mins. | Level Inches | Temp. of | pH |
| Suds | 5–7 | 5–6–8 | 180 | 11.2–11.4 |
| Suds | 5–7 | 5–6–8 | 160 | 11.0 |
| Suds | 5–7 | 5–6–8 | 160 | 10.8 |
| Bleach Suds | 5–7 | 5–6–8 | 155 | 10.5–10.6 |
| Rinse | 2 | 10–12–15 | 160 | |
| Rinse | 2 | 10–12–15 | 140 | |
| Rinse | 2 | 10–12–15 | 120 | |
| Rinse | 2 | 10–12–15 | 100 | |
| Sour | 3–4 | 5–6–8 | 90 | |
| Starch | 10 | 2 | 90 | 5.0–5.5 |

The bonded areas of the shirts using the polyamide adhesives of Examples II and IV of the invention were rated clear and transparent without yellowing after 50 cycles as above described. In contrast, the bonded areas from the polyamide of Example VIII were noticeably yellow after the same number of cycles.

EXAMPLE XII

The polyamide of Example III of the invention and the polyamide of Example VI were used to bond fabrics as in Example XI and the resulting shirts were subjected to 20 laundering cycles as described in Example XI. The bonded areas from the polyamide of Example III were found to be clear and transparent whereas the color of the bonded areas from the the polyamide of Example VI were yellow to brown.

EXAMPLE XIII

Example XII was repeated using the polyamide of Example II of the invention and the polyamide of Example VII. The bonded areas from the polyamide of Example II were clear and transparent after the 20 cycles whereas the bonded areas from the polyamide of Example VII were light yellow. It is theorized that the yellowing of the bonded areas from the prior polyamides is due to the fact that the same were prepared using ethylene diamine.

In general, fabrics can be bonded according to the present invention by placing the polyamide between two surfaces thereof and applying sufficient heat and pressure to cause the polyamide to melt and intimately associate with the fibers of the fabric. Preferably, temperatures in the range of 225° to 400°F. are used. It is also preferred to use pressures of 100 to 300 psi. In the home, the process can be carried out by pressing with a home iron in a stationary position for from 10 to 30 seconds using steam on a setting to give from 275°–400°F. By applying light pressure about 8 lbs. force is exerted. By applying firm pressure about 18 lbs. force is exerted. Better results are achieved using firm pressure. Temperature and pressure requirements are dictated somewhat by the thickness and type of fabric. The polyamide is preferably used in the form of a thin (about 2 to 10 mils thickness) extruded strip or sheet which can, if necessary, be cut to the desired bonding area size.

The embodiments of the invention in which an exclusive property or privilege is claimed are defined as follows:

1. An adhesive adapted for bonding cleanable fabrics comprising a polymeric fat acid copolyamide having a ball and ring softening point greater than 135°C. and an inherent viscosity of at least 0.5, said copolyamide being the thermal amidification product at a temperature of 100°–300°C. for a time sufficient to effect amidification, of (1) an acid component comprising: a mixture of:
   a. about 40 to 70 carboxyl equivalent percent of a polymeric fat acid having, as determined by gas-liquid chromatography, a dimeric fat acid content greater than 86% by weight and having been prepared by polymerizing ethylenically unsaturated monocarboxylic acids of 16 to 22 carbon atoms; and
   b. about 60 to 30 carboxyl equivalent percent of a copolymerizing dicarboxylic acid of the formula HOOC-R-COOH where R is a aliphatic hydrocarbon radical having 6–12 carbon atoms;
with essentially an amine equivalent amount of (2) an amine component comprising a mixture of:
   c. about 30 to 70 amine equivalent percent of hexamethylene diamine; and
   d. about 70 to 30 amine equivalent percent of a second diamine selected from the group consisting of xylylene diamine and isophorone diamine.

2. The adhesive as defined in claim 1 wherein the polymeric fat acid component (1)(a) is obtained by the polymerization of 18 carbon atom ethylenically unsaturated monocarboxylic acids.

3. The adhesive of claim 2 wherein the 18 carbon atom acids are the mixture of acids obtained from tall oil.

4. The adhesive of claim 3 wherein the copolymerizing diacid (1)(b) is azelaic acid.

5. The adhesive of claim 4 wherein the second diamine (2)(d) is xylene diamine.

6. The adhesive of claim 5 wherein the diamines (2)(c) and (2)(d) are present in the amine equivalent percent ratio of 60:40 to 40:60.

7. In the process of bonding fabrics wherein an adhesive is inserted between the surfaces thereof and sufficient heat and pressure is applied to cause the adhesive to melt and intimately contact the fibers of the fabric, the improvement consisting of using as the adhesive a polymeric fat acid copolyamide having a ball and ring softening point greater than 135°C. and an inherent viscosity of at least 0.5, said copolyamide being the thermal amidification product at a temperature of 100°–300°C. for a time sufficient to effect amidification, of (1) an acid component comprising: a mixture of: a. about 40 to 70 carboxyl equivalent percent of a polymeric fat acid having, as determined by gas-liquid chromatography, a dimeric fat acid content greater than 86% by weight and having been prepared by polymerizing ethylenically unsaturated monocarboxylic acids of 16 to 22 carbon atoms; and
   b. about 60 to 30 carboxyl equivalent percent of a copolymerizing dicarboxylic acid of the formula HOOC—R—COOH where R is an aliphatic hydrocarbon radical having 6–12 carbon atoms;
with essentially an amine equivalent amount of (2) an amine component comprising a mixture of:
   c. about 30 to 70 amine equivalent percent of hexamethylene diamine; and
   d. about 70 to 30 amine equivalent percent of a second diamine selected from the group consisting of xylylene diamine and isophorone diamine.

8. The bonded fabric produced by the process of claim 7.

9. The process of claim 7 wherein the polymeric fat acid component (1)(a) is obtained by the polymerization of 18 carbon atom ethylenically unsaturated monocarboxylic acids.

10. The process of claim 9 wherein the 18 carbon atom acids are the mixture of acids obtained from tall oil.

11. The process of claim 10 wherein the copolymerizing diacid (1)(b) is azelaic acid.

12. The process of claim 11 wherein the second diamine (2)(d) is xylylene diamine.

13. The process of claim 12 wherein the diamines (2)(c) and (2)(d) are present in the amine equivalent percent ratio of 60:40 to 40:60.

* * * * *